(12) United States Patent
Dardenne et al.

(10) Patent No.: US 9,178,986 B2
(45) Date of Patent: Nov. 3, 2015

(54) METHOD AND DEVICE FOR IDENTIFICATION OF AN IMPAIRMENT WITHIN A TELECOMMUNICATION LINE

(71) Applicant: Alcatel-Lucent, Paris (FR)

(72) Inventors: Xavier Dardenne, Grez-Doiceau (BE); Benoît Drooghaag, Ophain-Bois-Seigneur-Isaac (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/357,617

(22) PCT Filed: Nov. 19, 2012

(86) PCT No.: PCT/EP2012/072966
§ 371 (c)(1),
(2) Date: May 12, 2014

(87) PCT Pub. No.: WO2013/104453
PCT Pub. Date: Jul. 18, 2013

(65) Prior Publication Data
US 2014/0321623 A1     Oct. 30, 2014

(30) Foreign Application Priority Data

Jan. 10, 2012   (EP) .................................... 12305036

(51) Int. Cl.
*H04M 1/24*     (2006.01)
*H04M 3/08*     (2006.01)
(Continued)

(52) U.S. Cl.
CPC ................. *H04M 3/085* (2013.01); *H04B 3/46* (2013.01); *H04M 3/306* (2013.01); *H04M 11/062* (2013.01)

(58) Field of Classification Search
CPC ... H04M 3/306; H04M 3/085; H04M 11/062; H04M 3/46; H04J 11/16

USPC ......... 379/1.01, 1.04, 2, 22.02, 22.08, 23, 24, 379/27.01, 27.03, 28, 30, 32.01
See application file for complete search history.

(56) References Cited

U.S. PATENT DOCUMENTS 6,466,649 B1   10/2002   Walance et al.
6,975,706 B1 *   12/2005   Joffe et al. ................. 379/22.03
(Continued)

FOREIGN PATENT DOCUMENTS

CN    102301685 A    12/2011
EP    2214390 A1    8/2010
(Continued)

OTHER PUBLICATIONS

International Search Report PCT/ISA/210 for International Application No. PCT/EP2012/072966 Dated Dec. 5, 2012.
(Continued)

*Primary Examiner* — Binh Tieu
(74) *Attorney, Agent, or Firm* — Harness, Dickey & Pierce, P.L.C.

(57) ABSTRACT

The present invention refers to a method (45) for identification (53, 73) of an impairment (59) within a telecommunication line (13), the method (45) comprising determining (49) first measurement data (Hlog) that characterize a transfer function of the telecommunication line (13). In order to provide a method (45) for identification of an impairment (59) within the telecommunication line (13) that can be applied on the telecommunication line (13) without interrupting the operation of the line (13) and that can easily be implemented in connection with existing system such as existing DSL systems, it is suggested that the method (45) further comprise determining (55) at least one periodicity interval ($\Delta f_1$, $\Delta f_2$) of oscillations of the transfer function and that the impairment (59) be identified depending on said determining (55).

13 Claims, 4 Drawing Sheets

(51) Int. Cl.
*H04M 3/22* (2006.01)
*H04M 3/30* (2006.01)
*H04M 11/06* (2006.01)
*H04B 3/46* (2015.01)

(56) References Cited

U.S. PATENT DOCUMENTS

| | | | |
|---|---|---|---|
| 7,023,963 B1* | 4/2006 | Chu et al. | 379/15.05 |
| 8,331,537 B2* | 12/2012 | Feng | 379/1.04 |
| 8,767,809 B2* | 7/2014 | Berg et al. | 375/224 |
| 2002/0067802 A1* | 6/2002 | Smith et al. | 379/1.04 |
| 2005/0123027 A1* | 6/2005 | Cioffi et al. | 375/222 |
| 2005/0123028 A1 | 6/2005 | Cioffi et al. | |
| 2008/0071516 A1 | 3/2008 | Cioffi et al. | |
| 2008/0292064 A1* | 11/2008 | Wu et al. | 379/22.04 |
| 2011/0285400 A1 | 11/2011 | Defoort et al. | |

FOREIGN PATENT DOCUMENTS

| | | |
|---|---|---|
| WO | WO-0027134 A2 | 5/2000 |
| WO | WO-0143303 A2 | 6/2001 |
| WO | WO-2007008835 A2 | 1/2007 |
| WO | WO-2010086159 A1 | 8/2010 |

OTHER PUBLICATIONS

Written Opinion of the International Searching Authority PCT/ISA/237 for International Application No. PCT/EP2012/072966 dated Dec. 5, 2012.

* cited by examiner

METHOD AND DEVICE FOR IDENTIFICATION OF AN IMPAIRMENT WITHIN A TELECOMMUNICATION LINE

FIELD OF THE INVENTION

The present invention refers to a method for identification of an impairment within a telecommunication line. Furthermore, the invention refers to an impairment identification device for identification of an impairment within a telecommunication line and a computer program product programmed for executing the method for identification of the impairment.

BACKGROUND

It is known to perform Single Ended Line Testing (SELT) in Digital Subscriber Lines (DSL). SELT comprises reflectometry-based measurement procedures that allow for determining a location of an impairment in a pair of conductors of a subscriber line. Typically, the impairment reflects a signal transmitted over the subscriber line. Thus, the location of a the impairment can be determined by measuring a signal propagation time from a single end of the subscriber line to the impairment and back to that single end of the DSL. However, SELT requires a special test signal be transmitted over the subscriber line and normal operation of the subscriber line must be interrupted during SELT. Therefore, SELT is not well-suited for repeated or automatic tests of the subscriber line.

Furthermore, DSL systems typically provide procedures for Dual Ended Line Testing (DELT). DELT is carried out by two nodes connected to the different end points of the DSL, e.g. by an access node and a node that is part of the Customer Premises Equipment (CPE). Results of the DELT can be retrieved from nodes at end points of the subscriber line by means, for instance, of the Simple Network Management Protocol (SNMP).

SUMMARY

The object of the present invention is to provide a method for identification of an impairment within a telecommunication line that can be applied on a telecommunication line without interrupting the normal operation of the line and that can easily be implemented in connection with existing systems such as existing DSL or Power Line Communication (PLC) systems.

This object is solved by method for identification of an impairment within a telecommunication line, an impairment identification device, and a computer program product.

According to an embodiment, a method for identification of an impairment within a telecommunication line is provided, the method comprising determining first measurement data that characterize a transfer function of the telecommunication line, wherein the method further comprises detecting at least one periodicity interval of oscillations of the transfer function and wherein the impairment is identified depending on said detecting. In an embodiment, the method may comprise determining the at least one periodicity interval depending on the first measurement data and/or identifying the impairment depending on the determined at least one periodicity interval. When implementing this method, measurement data can be acquired without interrupting the normal operation of the telecommunication line, i.e. data transmission can continue during acquisition of the measurement data. In an embodiment, acquiring the measurement data comprises retrieving the measurement data from a network element to which the line is connected, e.g. from an access node or a customer premises node. In an embodiment, this network element may perform measurements to generate and store the measurement data during a certain phase during operating the line, e.g. during a synchronization phase. In another embodiment, the measurement data is generated and/or updated continuously. Therefore, the telecommunication line can be automatically and/or repeatedly checked in order to detect any impairment, possibly before the quality of the data transmission decreases in an extent that is noticeable e.g. by a customer.

Identification of the impairment may include detecting whether the communication line has an impairment or not. In an embodiment, the impairment is detected if the transfer function exhibits some oscillations. If the transfer function doesn't exhibit any oscillations then the method may determine that the line has no impairment.

In a preferred embodiment, said identification comprises estimating a location of the impairment within the telecommunication line depending on the periodicity interval of oscillations in the transfer function. However, according to another embodiment, the method detects the impairment depending on the periodicity interval without estimating the location of the impairment. Periodicities in the transfer function are caused by transmission mode conversion at the location of the impairment. The at least one periodicity interval depends on the distance of the impairment from an end point of the telecommunication line. Thus, the distance between the impairment and an end point can be estimated depending on the periodicity interval.

In order to determine the end point of the telecommunication line from which the estimated distance is to be measured in order to estimate the location of the impairment, in an embodiment, the method comprises determining second measurement data that characterize a noise level at end points of the transmission line and comparing the noise levels with each other.

In an embodiment, only the location of the impairment is estimated. In another embodiment, not only the location is estimated but also a type of the impairment is determined. In such an embodiment, the identification comprises determining a type of the impairment depending on the measurement data, preferably the first measurement data.

Preferably, the type of the impairment is determined depending on a position of at least one extremum of the transfer function. An embodiment may comprise determining the at least one position of the extremum.

In particular, a certain type of the impairment can be determined depending on the position of a maximum and/or a minimum of the transfer function oscillations. For example, the following approaches for determining the type can be applied.

A series resistance, including an open wire (which is a special case of a series resistance), can be detected if local minima of the transfer function are located at least essentially at frequencies corresponding to multiples of the periodicity interval of the transfer function, a series resistance, including an open wire, can also be detected if local maxima of the transfer function are located at least essentially at frequencies corresponding to odd multiples of half the periodicity interval, a shunt resistance, including a short circuit (which is a special case of a shunt resistance), can be detected if local minima of the transfer function are located at least essentially at frequencies corresponding to odd multiples of half the periodicity interval, and a shunt resistance, including a short circuit, can also be detected if local maxima of the transfer function are located at least essentially at frequencies corresponding to multiples of the periodicity interval of the transfer function.

In embodiments of the invention, at least one of the four above-mentioned approaches and any combination of these approaches can be applied.

In an embodiment, determining the type of the impairment comprises detecting a capacitance if a difference between the transfer function and a reference transfer function of the telecommunications line without impairment varies with the frequency.

In an embodiment, said determining the type of the impairment comprises discriminating between a series capacitance and a shunt capacitance depending on the run of the difference between the transfer function and a reference transfer function. Preferably, said determining the type of the impairment comprises detecting a series capacitance if the difference decreases with the frequency and/or detecting an impairment in the form of a shunt capacitance if the difference increases with the frequency.

In another embodiment, determining the type of the impairment comprises detecting a capacitance if an amplitude of oscillations of the transfer function varies with the frequency.

In an embodiment, determining the type of the impairment comprises discriminating between a series capacitance and a shunt capacitance depending on the run of the amplitude of the oscillations of the transfer function. Preferably, said determining the type of the impairment comprises detecting a series capacitance if the amplitude of oscillations of the transfer function decreases with the frequency and/or detecting a shunt capacitance if the amplitude increases with the frequency in a first frequency range and decreases with the frequency in a second frequency range, the first frequency range comprising lower frequencies than the second frequency range. For example, a shunt capacity may be detected if the amplitude first increases with the frequency before starting to slowly decrease at higher frequencies.

According to another embodiment, an impairment identification device for identification of an impairment within a telecommunication line is provided, wherein the device comprises a controller arranged for determining first measurement data that characterize a transfer function of the telecommunication line, wherein the controller is further arranged for detecting oscillations of the transfer function and at least one periodicity interval of these oscillations, and wherein the impairment is identified depending on said detecting.

In a preferred embodiment, controller is arranged, preferably programmed for executing a method according to the invention, embodiments of which are herein described. The controller may be a computer. The controller may comprise a processor and a storage element. The storage element may comprise a computer program that is programmed such that the processor executes the method when running the computer program.

In an embodiment, the device is a part of a network element connected to the telecommunication line, preferably an access node or a customer premises node. In another embodiment, the device is a station connectable to the network or a part thereof. The access node may be a DSL access node. The customer premises node may be e.g. a DSL modem or include a DSL modem.

According to an embodiment, a computer program product, preferably a storage medium, comprising a computer program is provided, wherein the computer program is programmed for executing the method when run on a computer.

The storage medium may be e.g. an optical or magnetic disc, semiconductor storage, and the like. In addition, a server may be provided from which the program can be retrieved e.g. over a communication network such as the Internet.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
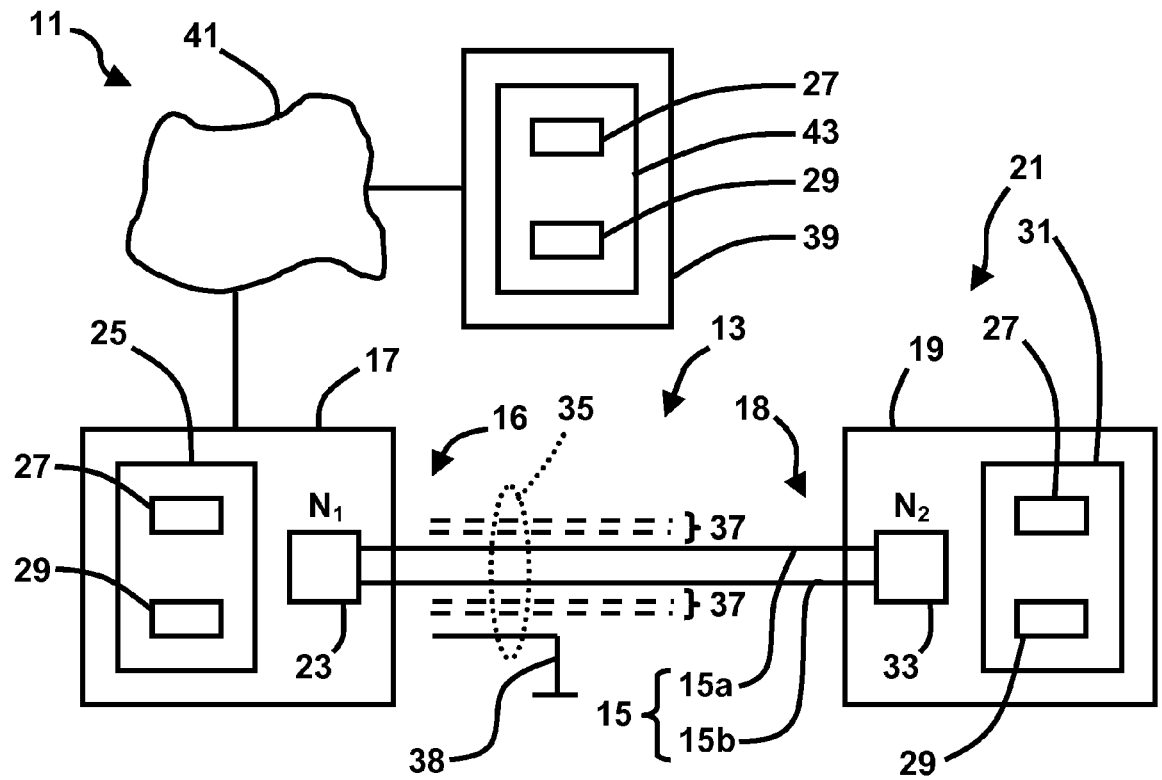
FIG. 1 shows a communication network.

FIG. 1 shows a communication network 11 comprising a telecommunication line 13. The telecommunication line 13 has a pair 15 of electrical conductors 15a, 15b with a first end 16 of the pair 15 being connected to a network side termination node of the network 11, further referred to as access node 17, and a second end 18 of the pair 15 being connected to a terminal side termination node 19 of the network 11. The terminal side termination node 19 may be part of customer premises equipment (CPE 21) of the network 11.

In the shown embodiment, the telecommunication line 13 is a Digital Subscriber Line (DSL), such as an ADSL, a VDSL or the like. Consequently, the access node 17 may be a DSL Access Multiplexer (DSLAM) or another type of DSL access node. The terminal side termination node 19 may be a DSL modem or include a DSL modem. However, the present invention is not limited to DSL. In another embodiment, the network 11 comprises a different type of telecommunication line 13, e.g. a power line for Power Line Communication (PLC).

The access node 17 has first modem circuitry 23 to which the first end 16 of the pair 15 is connected. In addition, the access node 17 has a first controller 25 adapted for controlling the operation of the access node 17. In an embodiment, the first controller 25 is a programmable computer comprising a processor 27, e.g. a microprocessor, and a storage element 29, e.g. semiconductor memory.

The terminal side termination node 19 includes second modem circuitry 33 to which the second end 18 of the pair 15 is connected. Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least a part of the pair 15 is part of a binder 35 and extends in parallel to further conductor pairs 37. The binder 35 may comprise an electrically conductive, preferably metallic, shielding 38 that may be grounded as depicted in FIG. 1.

Furthermore, the network 11 may comprise an optional station 39 connected e.g. via an interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server computer, a personal computer, a handheld computer such as a PDA or cell phone, etc.

At least one of the controllers 25, 31, or 43 is arranged for executing a method for identification of an impairment within the telecommunication line 13, in particular within the pair 15 of conductors 15a, 15b. To this end, a computer program may be provided that is programmed such that at least one of the controllers 25, 31, 43 executes the method when running said computer program. In other words, the method may be executed on the access node 17, on the station 39, or the terminal side termination node 19. The computer program may be stored on at least one storage element 29. In addition, the computer program may be stored on any type of data storage media such as magnetic or optical disk or semiconductor storage media. Furthermore, the program can be provided by a server for transmission over a network, preferably the Internet.

Figure 2:
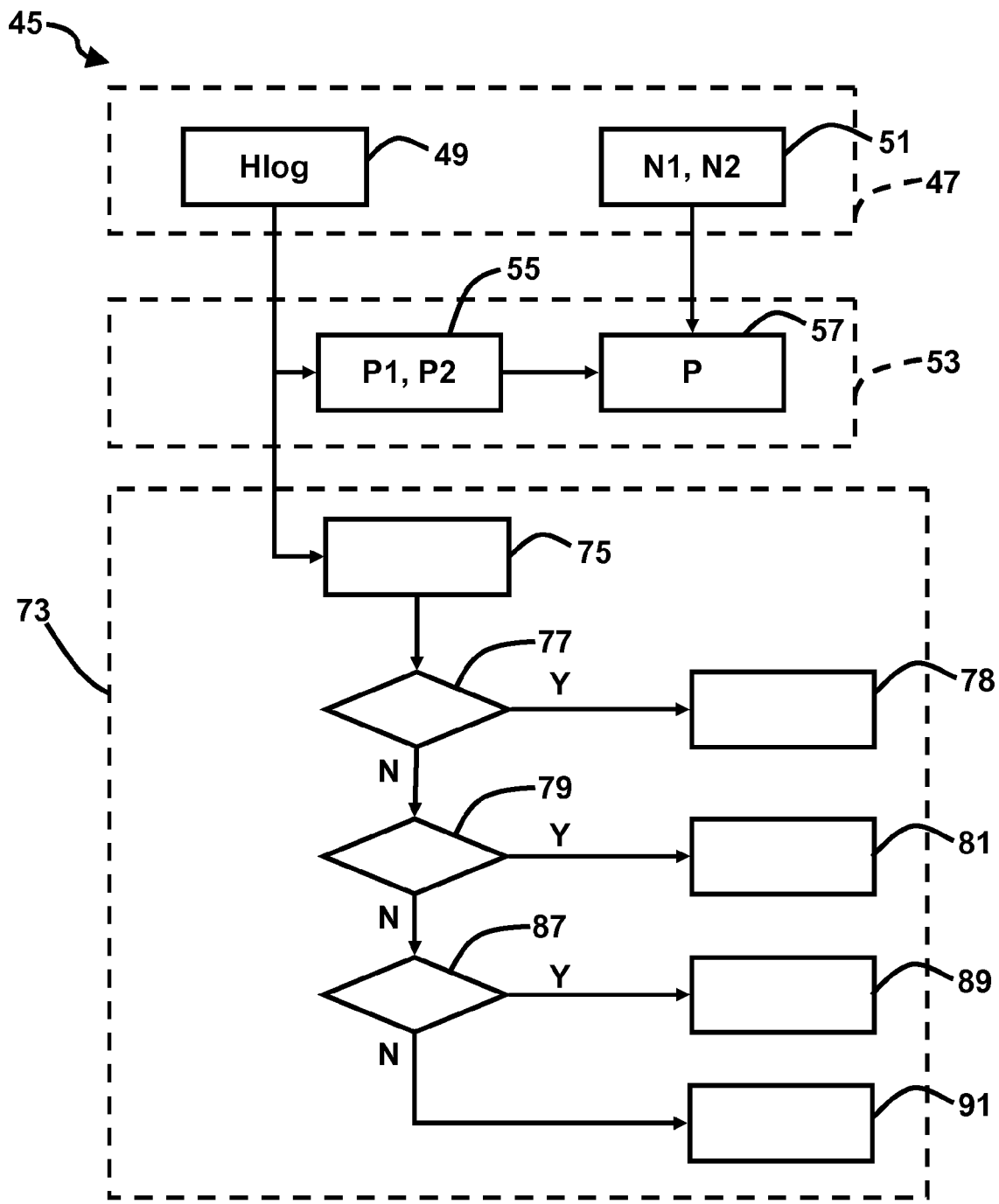
FIG. 2 shows a flow chart of a method for identification of an impairment within a telecommunication line of the network shown in FIG. 1.

FIG. 2 shows the method 45 in detail. The method 45 comprises a measurement block 47 for retrieving measurements related to the telecommunication line 13, in particular to the pair 15. For example, the measurement block 47 may comprise a step 49 for retrieval of first measurement data Hlog. In the shown embodiment, the first measurement data Hlog characterize the magnitude of a transfer function between the two ends 16, 18 of the pair 15 preferably in a logarithmic scale. For example, the first measurement data Hlog may include multiple values of the magnitude with each value corresponding to a different frequency of a signal to be transmitted over the pair 15.

Furthermore, measurement block 47 may comprise a step 51 that retrieves second measurement data from the access node 17 and/or the terminal side termination node 19, which second measurement data include a first noise level value N1 and a second noise level value N2. The first noise level value N1 characterizes a noise level at the first end 16 of the pair 15. The second noise level value N2 characterizes a noise level at the second end 18 of the pair 15.

In the shown embodiment, the first measurement data Hlog and/or the second measurement data N1, N2 are generated by means of a Dual Ended Line Testing (DELT) procedure carried out by the access node 17 and the terminal side termination node 19. Step 49 retrieves the first measurement data HLog Step 51 retrieves the second measurement data N1, N2. In particular, when executing the method 45 on a different node (e.g. the station 39) than the access node 17 and the terminal side termination node 19, a communication protocol may be applied for transferring the first and/or second measurement data Hlog, N1, N2 over the interconnection network 41 to that node. In an embodiment, the communication protocol is the Simple Network Management Protocol (SNMP). That is, the station 39 may retrieve the first measurement data Hlog and/or the second measurement data N1, N2 from the access node 17 using SNMP.

In an embodiment, the DELT procedure is performed during a certain phase of operation of the line 13 and the first and second modem circuitry 23, 33, during which synchronization of the first modem circuitry 23 and the second modem circuitry 33 with each other takes place. Synchronization may be carried out e.g. during power up of the access node 17 or the CPE 21 or after a temporary interruption of the connection between the first modem circuitry 23 and the second modem circuitry 33. The access node 17 and/or the terminal side termination node 19 may store the first measurement data Hlog and/or the second measurement data N1, N2 generated during a DELT locally so that the method 45 may retrieve them later.

As shown in FIG. 2, the steps 49 and 51 are performed at least partly in parallel. In another embodiment, the steps 49 and 51 are executed sequentially with respect to each other.

The method 45 comprises a localization block 53 that determines whether the pair 15 has an impairment and estimates a location of the impairment. The localization block 53 may be executed after the measurement block 47. A step 55 of the localization block 53 estimates possible locations P1, P2 of the impairment if an impairment has been detected. In the shown embodiment, two possible locations P1, P2 are detected depending on a periodicity of a transfer function of the pair 15 between the nodes 17, 19. A step 57 of the localization block 53 selects one of the possible locations P1, P2 as a final estimated location P of the impairment. To this end, step 57 compares the noise levels N1, N2 with each other and decides, based on this comparison, which one of the possible locations P1, P2 shall be selected as the estimated location P. The noise level N1, N2 at the end of the line 13 that is located closer to the impairment than the other end will be higher than the noise level N2, N1 at the other end of the line 13. Therefore, step 57 determines the end 16, 18 of the line 13 that has the largest noise level N1, N2 and selects the closest possible location P1, P2 to that end 16, 18 as the estimated location P.

By means of step 57, the location of the impairment can be estimated quite accurately. However, in another embodiment, the method 45 does not include step 57 and the localization block 53 determines the possible locations P1, P2 only without selecting the final estimated location P from the possible locations P1, P2.

Figure 3:
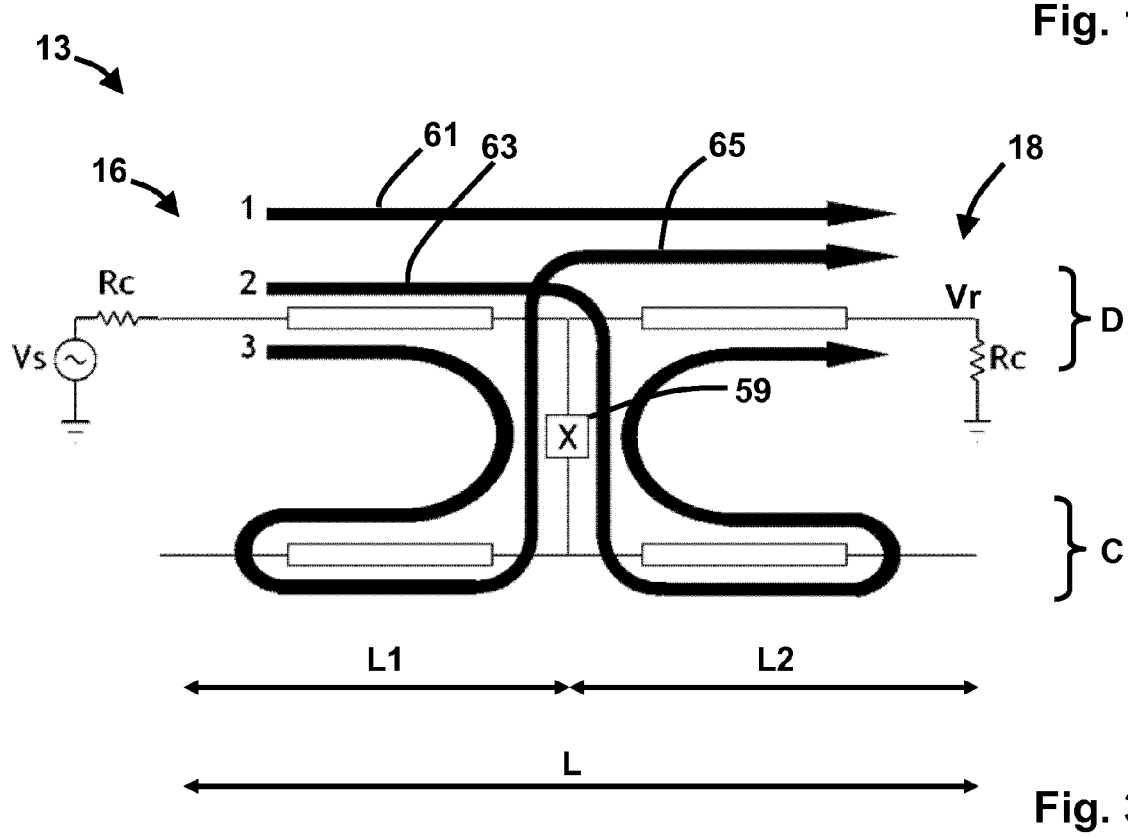
FIG. 3 shows signal paths along the telecommunication line comprising a differential transmission mode and a common transmission mode.

FIG. 3 schematically shows the line 13 having an impairment 59. L1 denotes the distance between the first end 16 of the line 13 and the impairment 59. L2 denotes the distance between the second end 18 of the line 13 and the impairment 59. L=L1+L2 denotes a total length of the line 13, i.e. of the pair 15.

Arrows shown in FIG. 3 correspond to different propagation paths of a signal $V_s$ transmitted over the line 13 according to different transmission modes. At the top of FIG. 3, a differential mode D is depicted. A common mode C is shown at the bottom. In differential mode D, both ends 16, 18 of the line 13 are terminated by termination resistances Rc. The signal Vs is fed into the pair 15 of the line in differential mode D. Because in the shown embodiment the line 13 is not intended to be applied in common mode C, the part of the line 13 at the bottom of FIG. 3 is open. Thus, a signal transmitted in common mode C is not terminated.

In case of an intact line (without any impairments) the signal $V_s$ would propagate in differential mode D only along a first path (arrow 61) directly from the first end 16 of the line 13 (on the left hand side in FIG. 3) to the second end 18 of the line (on the right hand side in FIG. 3). However, the impairment 59 causes a mode conversion within the line 13. As a consequence, a part of the energy of the signal $V_s$ is transferred from the differential mode D to the common mode C and reflected to both ends 16, 18 of the line 13. Because the line 13 is not terminated with respect to the common mode C, the ends 16, 18 of line 13 reflect common mode signals. Common mode signals arriving at the impairment 59 are, at least partially, converted back into corresponding differential mode signals and transmitted to the ends 16, 18 of the line, where they are terminated. Consequently, the impairment 59 introduces a second path (arrow 63) from the first end 16, through the impairment 59, over the second end 18, back to the impairment 59 and ending at the second end 18 of the line. A third path (arrow 65) starts at the first end 16 of the line, goes through the impairment 59, returns to the first end 16, goes through the impairment 59 again, and ends at the second end 18 of the line 13.

A received signal $V_r$ at the second end 18 of the line 13 corresponds to a superposition of the signal $V_s$ propagated along the three different propagation paths 61, 63, 65, i.e. $V_r = V_{r1} + V_{r2} + V_{r3}$. Phasors can be used to represent the signals at the second end 18 of the line 13 as follows:

$$V_{s1} = e^{-\gamma_d \cdot (L_1 + L_2)}$$

$$V_{s2} = e^{-(\gamma_d \cdot (L_1 + L_2) + 2 \gamma_c L_2)}$$

$$V_{s3} = e^{-(\gamma_d \cdot (L_1 + L_2) + 2 \gamma_c L_1)}$$

The signal at the second end 18 of the line 13 can be written as $$V_s = e^{-\gamma_d \cdot (L_1 + L_2)} (1 + T \cdot e^{-2 \gamma_c \cdot L_1} + T \cdot e^{-2 \gamma_c \cdot L_2}).$$

In the above equations, $\gamma_c$ and $\gamma_d$ are respectively the propagation constants for the common and differential modes. The real part of these constants is responsible for the signal attenuation while the imaginary part is related to the phase velocity. T is a factor describing the amplitude of the signals transferred between modes. Hence, the amplitude of the total signal consists in a decaying exponential (amplitude of the first term) modulated by an oscillating function (amplitude of the second term between parentheses).

Then, using the fact that $$\mathrm{Im}[\gamma_c] = 2\pi \frac{f}{v},$$

where f is the frequency and v, the phase velocity, the periodicities in frequency for the two exponentials are expressed as follows:

$$\Delta f_1 = \frac{v}{2L_1}$$

and $$\Delta f_2 = \frac{v}{2L_2}.$$

So, after having determined the periodicity of the Hlog oscillations, the two distances L1, L2 are known. However, there is an ambiguity on the location of the fault because the expression $V_s$ is symmetrical in L1 and L2, so L1 and L2 can be interchanged without affecting the result. Thus, step 55 determines the two possible locations P1, P2 according to the two possible assumptions regarding the values of L1 and L2.

Figure 4:
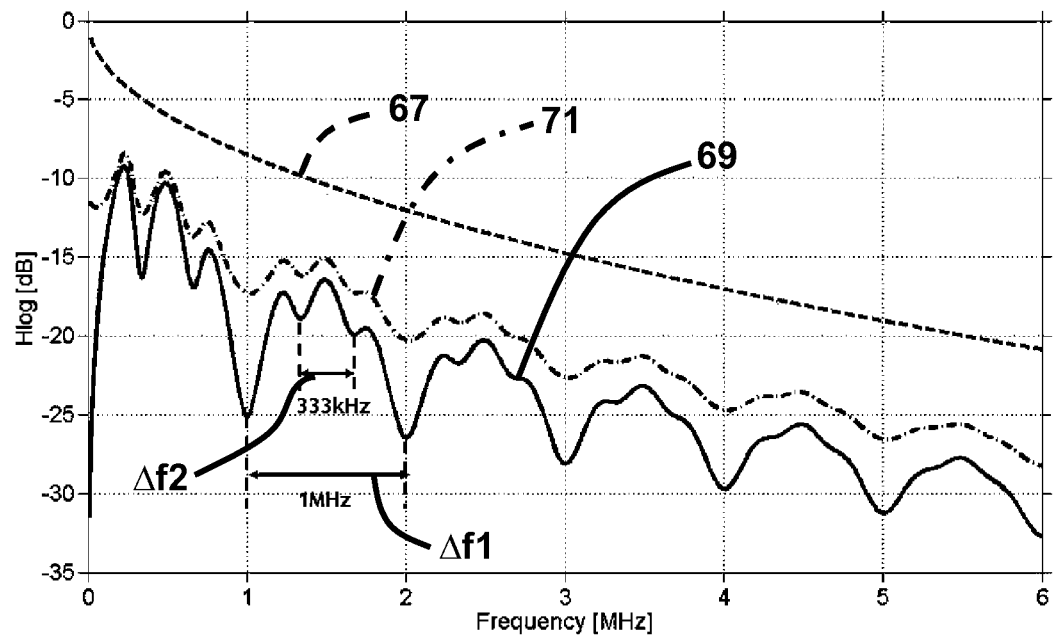
FIG. 4 shows a transfer function of the telecommunication line in case of a series resistance and an open wire in the telecommunication line.

FIG. 4 shows the measurement data Hlog in the form of the magnitude of the transfer function in the logarithmic scale in case that there is no impairment (curve 67). In addition, the measurement data Hlog is shown in case that there is an impairment 59 in the form of an open wire (curve 69) and in case that there is an impairment 59 in the form of a 500 Ohms series resistance (curve 71). The open wire impairment is considered as a special case of a series resistance impairment. Measurement data Hlog that has been determined when there is an impairment 59 has the above-described oscillations. Step 55 of the method 45 determines these oscillations by analyzing the measurement data Hlog. In the shown example, two oscillations are determined which have the periodicity $\Delta f_1 = 1000$ kHz and $\Delta f_2 = 333$ kHz, respectively. Using e.g. the above equations, step 55 calculates the values L1=100 m and L2=300 m, assuming $v = 2 \cdot 10^8$ m/s.

However, this solution is not unique. L1=300 m and L2=100 m is also a valid solution to the above equations. Thus, there are two possible locations P1, P2 of the impairment 59. The impairment 59 may be located P1=100 m away from the first end 16 or P2=300 m away from the first end 16. As described above, step 57 selects the most probable location P of the impairment 59 from the possible locations P1, P2 based on the noise level values N1, N2. Preferably, step 57 compares the noise level values N1, N2 with each other and determines the largest noise level value Nmax among the two noise level values N1, N2. Then step 57 selects the possible location P1, P2 that is closest to the end 16, 18 with the largest noise level value Nmax as the most probable estimated location P of the impairment.

Besides determining the location P of the impairment 59, identification of the impairment 59 may additionally comprise determining a type of the impairment 59. To this end, the method 45 comprises a classification block 73 that can be executed e.g. after the localization block 53 (see FIG. 2). Possible types of the impairment 59 may include a series resistance within one of the conductors 15a, 15b of the line 13, a shunt resistance between a conductor 15a, 15b and ground 38 or other conductors 37, a series capacitance within a conductor 15a, 15b, and a shunt capacitance between a conductor 15a, 15b and ground 38 or other conductors 37.

The factor T of the above equation depends on the type of the impairment. A purely resistive fault results in a real valued T. A fault with a capacitive component such as a series capacitance or a shunt capacitance leads to a non-zero imaginary part of factor T. A series impairment causes a negative valued T and a shunt impairment causes a positive valued T.

Assuming that T is real and positive, the local maxima of second term of $V_s$ occur if the two exponentials are real and positive, i.e. if $$2 \cdot \mathrm{Im}[\gamma_c] \cdot L_1 = n \cdot 2\pi \text{ or } 2 \cdot \mathrm{Im}[\gamma_c] \cdot L_2 = n \cdot 2\pi.$$

The conditions for the frequency $f_{max}$ where the maxima occur are $$f_{max} = n \cdot \frac{v}{2L_1}$$

or $$f_{max} = n \cdot \frac{v}{2L_2}$$

This means that for a positive real-valued factor T, the local maxima of the transfer function of the line 13 are located at frequencies $f_{max}$ corresponding to multiples of the frequency periodicities $\Delta f_1$, $\Delta f_2$.

In the same way, the local minima of second term of $V_s$ occur when the two exponentials are real and negative and correspond to the following frequencies:

$$f_{min} = (2n+1) \cdot \frac{v}{4L_1}$$

or $$f_{min} = (2n+1) \cdot \frac{v}{4L_2}$$

This means that for a positive real-valued factor T, the local minima of the transfer function are located at frequencies corresponding to odd multiples of half the frequency periodicities. If the factor T is negative, the positions of local minima and maxima are inverted.

In case of a capacitive impairment, the imaginary part of T corresponds to a phase shift in the two exponentials resulting in a shift of the local extrema along the frequency axis. Thus an impairment of a capacitive type can be discriminated from a resistive impairment by means of the location of the extrema.

In the following, an exemplary approach is described according to which the method 45 determines the type of the impairment depending on the absolute position of local minima of the transfer function in the frequency scale. The classification block 73 has a step 75 that determines the local minima of the transfer function. According to the method 45, a first branch 77 is executed after the step 75. This first branch 77 checks whether the position of the local minima corresponds at least essentially to multiples of the periodicities $\Delta f_1$, $\Delta f_2$. If so (Y) then the method 45 detects that the impairment 59 is a series resistance (step 78). Otherwise (N), a second branch 79 is executed. As can been seen in FIG. 4—which shows the transfer function 69, 71 in case of a series resistance—the local minima occur at frequencies that are multiple of periodicity $\Delta f_1$=1000 kHz and $\Delta f_2$=333 kHz, e.g. at 333 kHz, 666 kHz, 1000 kHz, 1333 kHz, 1666 kHz, 2000 kHz, etc.

Figure 5:
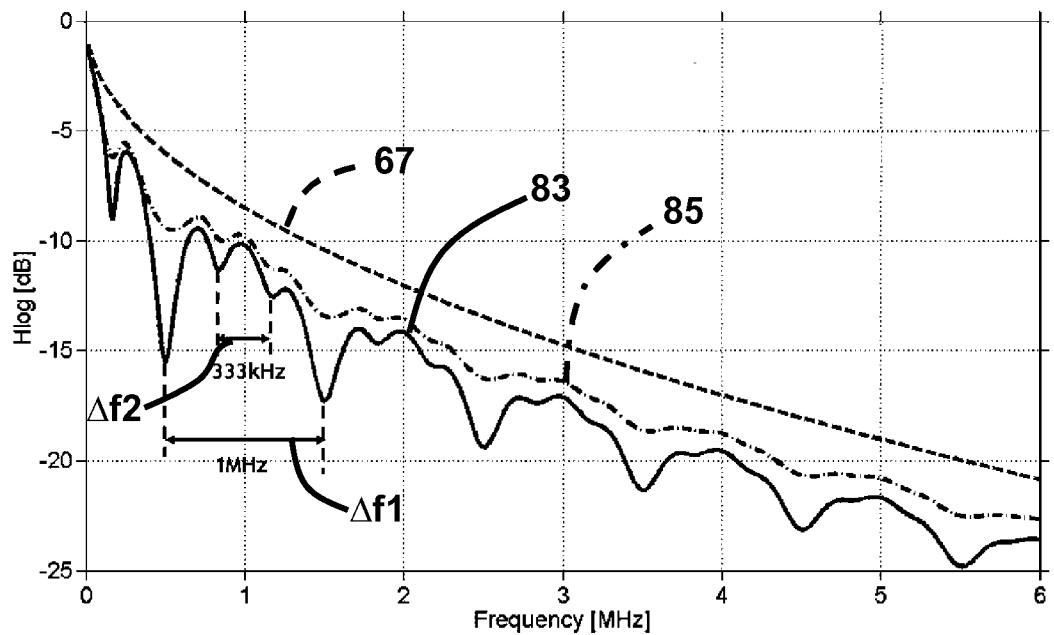
FIG. 5 shows a transfer function in case of a shunt resistance and a short circuit between a conductor of the telecommunication line and ground.

The second branch 79 checks whether the local minima correspond at least essentially to odd multiples of half of the periodicities, i.e. odd multiples of $\Delta f_1/2$ and $\Delta f_2/2$. If so (Y) then the method 45 detects in step 81 that the impairment 59 is a shunt resistance between a conductor 15a, 15b to ground 38 or to another conductor 37. FIG. 5 shows the transfer function in case of a short circuit to ground (curve 83) at one of the conductors 15a, 15b and the transfer function in case of a resistive path between one of the conductors 15a, 15b and ground (curve 85). The local minima occur at frequencies that are odd multiples of half the periodicities $\Delta f_1$=1000 kHz and $\Delta f_2$=333 kHz, e.g. at 166.5 kHz, 499.5 kHz, 832.5 kHz, 1165.6 kHz, etc.

If the second branch 79 does not detect that the local minima correspond at least essentially to odd multiples of half of the periodicities (N) then a third branch 87 is executed. The third branch 87 checks whether a difference 8 between the actual transfer function and the transfer function 67 in case of no impairment 59 decreases with the frequency. If so (Y) then an impairment 59 in the form of a series capacitance is detected in a step 89. Otherwise (N), an impairment 59 in the form of a shunt capacitance between a conductor 15a, 15b and ground 38 or a different conductor is detected in a further step 91.

Figure 6:
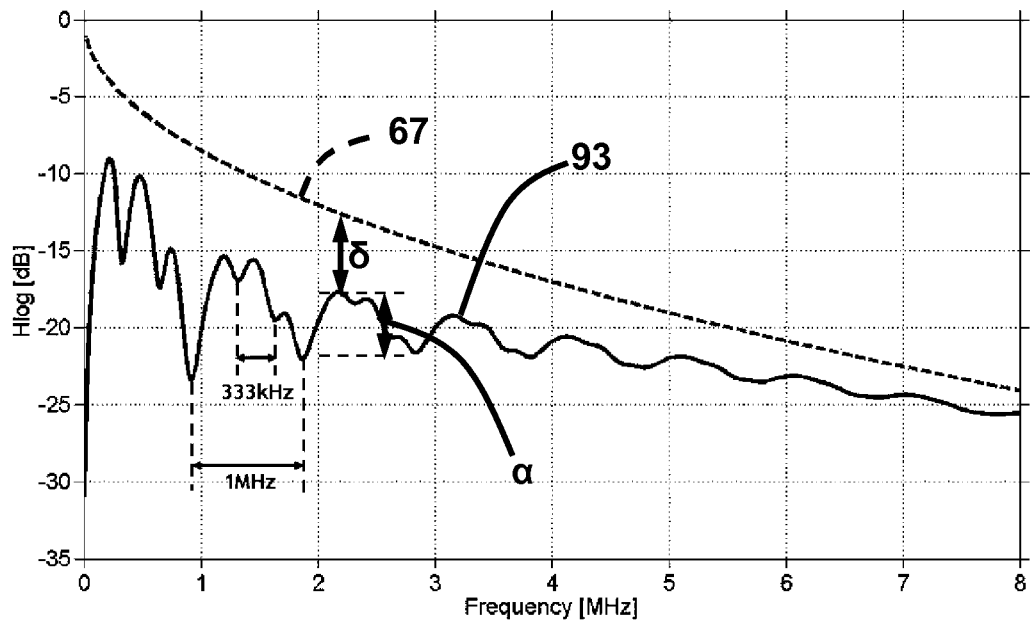
FIG. 6 shows a transfer function in case of a series capacitance in the telecommunication line.

FIG. 6 shows the transfer function in case of an impairment in the form of a series capacitance within one of the conductors 15a, 15b (curve 93). The difference 8 between that transfer function 93 and the transfer function in case of no impairment (reference transfer function 67) decreases with the frequency because the impedance of the series capacitance decreases with the frequency.

Figure 7:
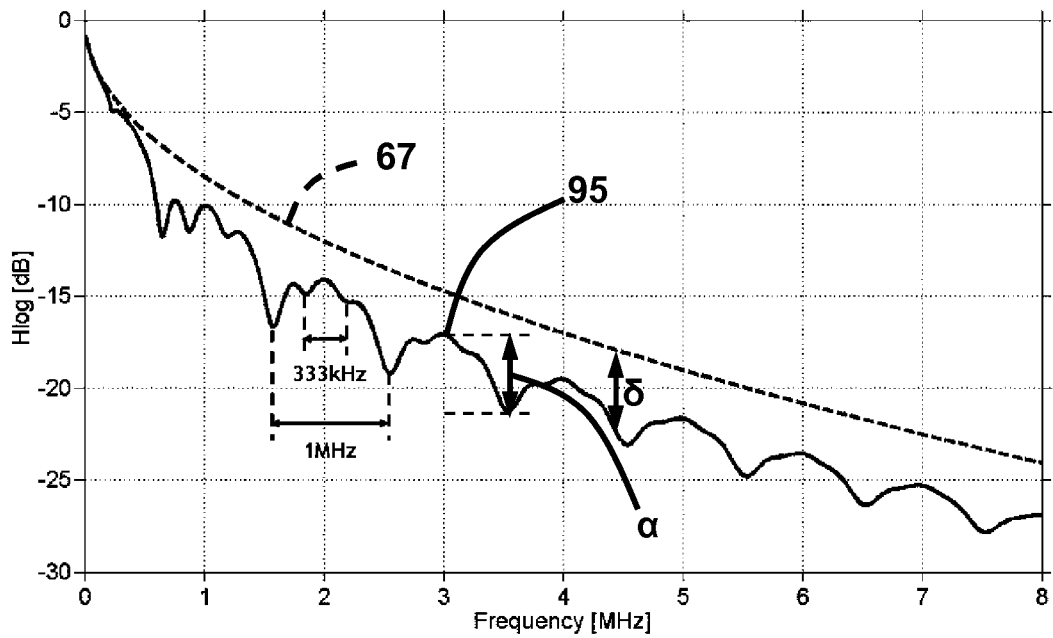
FIG. 7 shows a transfer function in case of a shunt capacitance between a conductor of the telecommunication line and ground.

FIG. 7 shows the transfer function in case of an impairment in the form of a shunt capacitance between one of the conductors 15a, 15b and ground (curve 95). The difference δ between that transfer function 95 and the reference transfer function 67 does not decrease with the frequency. In the shown example, the difference δ between the transfer functions 95, 67 rather increases with the frequency. Therefore, the method 45 can discriminate between the series capacitance and the shunt capacitance based on run of the difference 8 between the transfer functions 93 and 67 and the difference δ between the transfer functions 95 and 67.

In another embodiment, the method 45 discriminates between the series capacitance and the shunt capacitance depending on the run of an amplitude a of the oscillations of the transfer function 93, 95. In case of the series capacitance (curve 93), the amplitude a quickly decreases with the frequency. In case of the shunt capacitance (curve 95), the amplitude a first increases with the frequency before starting to slowly decrease at higher frequencies.

In the shown embodiment, the positions of minima in the transfer function are determined and the type of the impairment is determined depending on these positions. However, in other embodiments—alternatively to the positions of the minima or additionally to the positions of the minima—positions of maxima of the transfer functions may be determined and the type of the impairment may be determined depending of the positions of the maxima. In particular, the shown exemplary method 45 can easily be modified such that the type of the impairment is determined depending on positions of the maxima.

To sum up, the method, device and computer program product described herein allows to identify (detect, localize, and/or classify) an impairment 59 within the telecommunication line 13 depending on oscillation periodicities in the transfer function of the telecommunications line 13. Because the periodicities can be determined by using first measurement data Hlog acquired by DELT, the impairment can be identified without interrupting the normal operation, e.g. data transmissions, of the line 13. Therefore, the line 13 can be checked for an impairment 59 on a regular basis. If an impairment 59 has been identified, a network operator can send a technician to the right place in order to repair the line 13. As a consequence, the impairment 59 can be removed quickly and cost efficiently.

The invention claimed is:
1. A method for identification of an impairment within a telecommunication line, the method comprising:
    determining first measurement data that characterize a
        transfer function of the telecommunication line;

determining at least one periodicity interval of the transfer function;

estimating at least two target impairment locations within the telecommunication line based on the at least one periodicity interval of the transfer function;

determining noise levels at end points of the telecommunication line; and identifying one of the at least two target impairment locations as the impairment within the telecommunication line based on the determined noise levels at end points of the telecommunication line.

2. The method according to claim 1, wherein the determining the noise levels determines the noise levels based on second measurement data that characterize a noise level at each of the end points of the telecommunication line.

3. The method according to claim 1, wherein the method further comprises:

determining a type of the impairment depending on the first measurement data.

4. The method according to claim 3, wherein the type of the impairment is determined depending on a position of at least one extremum of the transfer function.

5. The method according to claim 3, wherein said determining the type of the impairment comprises:

detecting at least one of a series resistance and an open wire if local minima of the transfer function are located in proximity of frequencies corresponding to multiples of the at least one periodicity interval of the transfer function, and detecting at least one of a shunt resistance or a short circuit if local minima of the transfer function are located in proximity of frequencies corresponding to odd multiples of half the at least one periodicity interval.

6. The method according to claim 3, wherein said determining the type of the impairment comprises:

detecting at least one of a shunt resistance and a short circuit if local maxima of the transfer function are located in proximity of frequencies corresponding to multiples of the at least one periodicity interval of the transfer function, and detecting at least one of a series resistance and an open wire if local maxima of the transfer function are located at least essentially at frequencies corresponding to odd multiples of half the at least one periodicity interval.

7. The method according to claim 3, wherein said determining the type of the impairment comprises:

detecting a capacitance if a difference between the transfer function and a reference transfer function of the telecommunications line without impairment varies with a frequency of a signal to be transmitted over the telecommunications line.

8. The method according to claim 7, wherein the determining the type of the impairment comprises:

discriminating between a series capacitance and a shunt capacitance depending on the run of the difference between the transfer function and a reference transfer function.

9. The method according to claim 8, wherein the determining the type of the impairment comprises:

detecting a series capacitance if a difference decreases with the frequency, and detecting an impairment in the form of a shunt capacitance if the difference increases with the frequency.

10. The method according to claim 7, wherein the determining the type of the impairment comprises:

detecting a series capacitance if an amplitude of oscillations of the transfer function decreases with the frequency, and detecting a shunt capacitance if the amplitude increases with the frequency in a first frequency range and decreases with the frequency in a second frequency range, the first frequency range including lower frequencies than the second frequency range.

11. A device for identification of an impairment within a telecommunication line, the device comprising:

a processor configured to, determine first measurement data that characterize a transfer function of the telecommunication line, determine at least one periodicity interval of the transfer function, estimating at least two target impairment locations within the telecommunication line based on the at least one periodicity interval of the transfer function, determining noise levels at end points of the telecommunication line, and identifying one of the at least two target impairment locations as the impairment within the telecommunication line based on the determined noise levels at end points of the telecommunication line.

12. The device according to claim 11, wherein the device is a part of a network element connected to the telecommunication line, the network element being at least one of an access node, a customer premises node, and a station connectable to the network.

13. A computer-readable medium including computer-program product, the computer-program product comprising computer-readable instructions, which when executed by a processor, causes the processor to execute a method according to claim 1.

* * * * *